US006311262B1

(12) United States Patent
Hachmann et al.

(10) Patent No.: US 6,311,262 B1
(45) Date of Patent: Oct. 30, 2001

(54) APPARATUS FOR THE HIERARCHICAL AND DISTRIBUTED CONTROL OF PROGRAMMABLE MODULES IN LARGE-SCALE INTEGRATED SYSTEMS

(75) Inventors: Ulrich Hachmann; Wolfgang Raab; Ulrich Ramacher, all of München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/642,327

(22) Filed: Aug. 21, 2000

Related U.S. Application Data

(63) Continuation of application No. PCT/DE99/00101, filed on Jan. 18, 1999.

(51) Int. Cl.[7] .................................................. G06F 15/76
(52) U.S. Cl. ................................ 712/32; 712/11; 712/24; 713/400
(58) Field of Search ................................ 712/11, 24, 32; 713/400

(56) References Cited

U.S. PATENT DOCUMENTS

| Re. 36,954 | * | 11/2000 | Shindo et al. | ............................ 712/11 |
| 5,440,721 | * | 8/1995 | Morgan et al. | ........................ 713/502 |
| 5,463,663 | * | 10/1995 | Maruyama et al. | .................. 375/356 |
| 6,216,223 | * | 4/2001 | Revilla et al. | ........................ 712/245 |

FOREIGN PATENT DOCUMENTS

| 0328721A2 | 8/1989 | (EP) . |
| 0544083A2 | 6/1993 | (EP) . |
| 0768602A2 | 4/1997 | (EP) . |

OTHER PUBLICATIONS

"An Alternative Approach Towards The Design Of Control Units", Rajiv Jain et al., 322 Microelectronics and Reliability 24, 1984, No. 6, Exeter, Great Britain, pp. 1009–1012.
"Multithreading with Distributed Functional Units", Bernard K, Gunter, IEEE Transactions on Computers, vol. 46, No. 4, Apr., 1997, pp. 399–411.
"A Variable Instruction Stream Extension to the VLIW Architecture", Andrew Wolfe et al., 8345 Computer Architecture News 19, Apr. 1991, No. 2, New York, pp. 2–14.
"Asynchronous Polycyclic Architecture", Geraldo Line de Campos 12118 Second Joint International Conf. on Vector and Parallel Processing, Sep. 1992, Lyon, France, Berlin, Germany, pp. 387–398.

* cited by examiner

*Primary Examiner*—Kenneth S. Kim
(74) *Attorney, Agent, or Firm*—Herbert L. Lerner; Laurence A. Greenberg; Werner H. Stemer

(57) ABSTRACT

The apparatus has a multiplicity of control modules which are assigned to a multiplicity of processing modules for driving purposes. These separate control modules are driven by a superordinate controller and are synchronized by a common synchronization unit on the basis of, by way of example, handshake lines and semaphores. The effect achieved by such an apparatus is that the transmission bandwidth between an external instruction memory and the large-scale integrated system can be reduced, and the total power loss can be lowered by intermittently disconnecting processing modules which are currently not needed. Furthermore, such an architecture supports the separate development of control programs for the individual control modules.

6 Claims, 6 Drawing Sheets

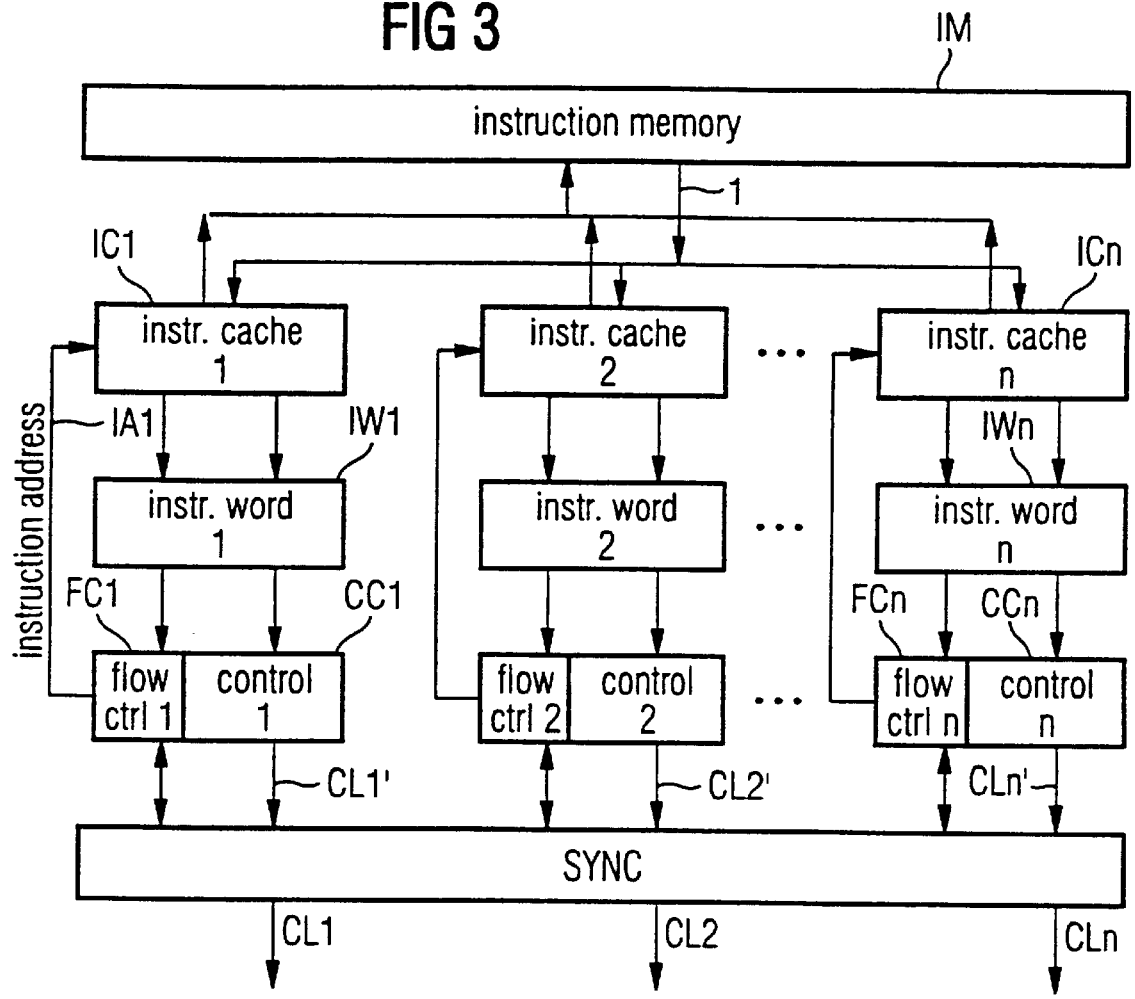

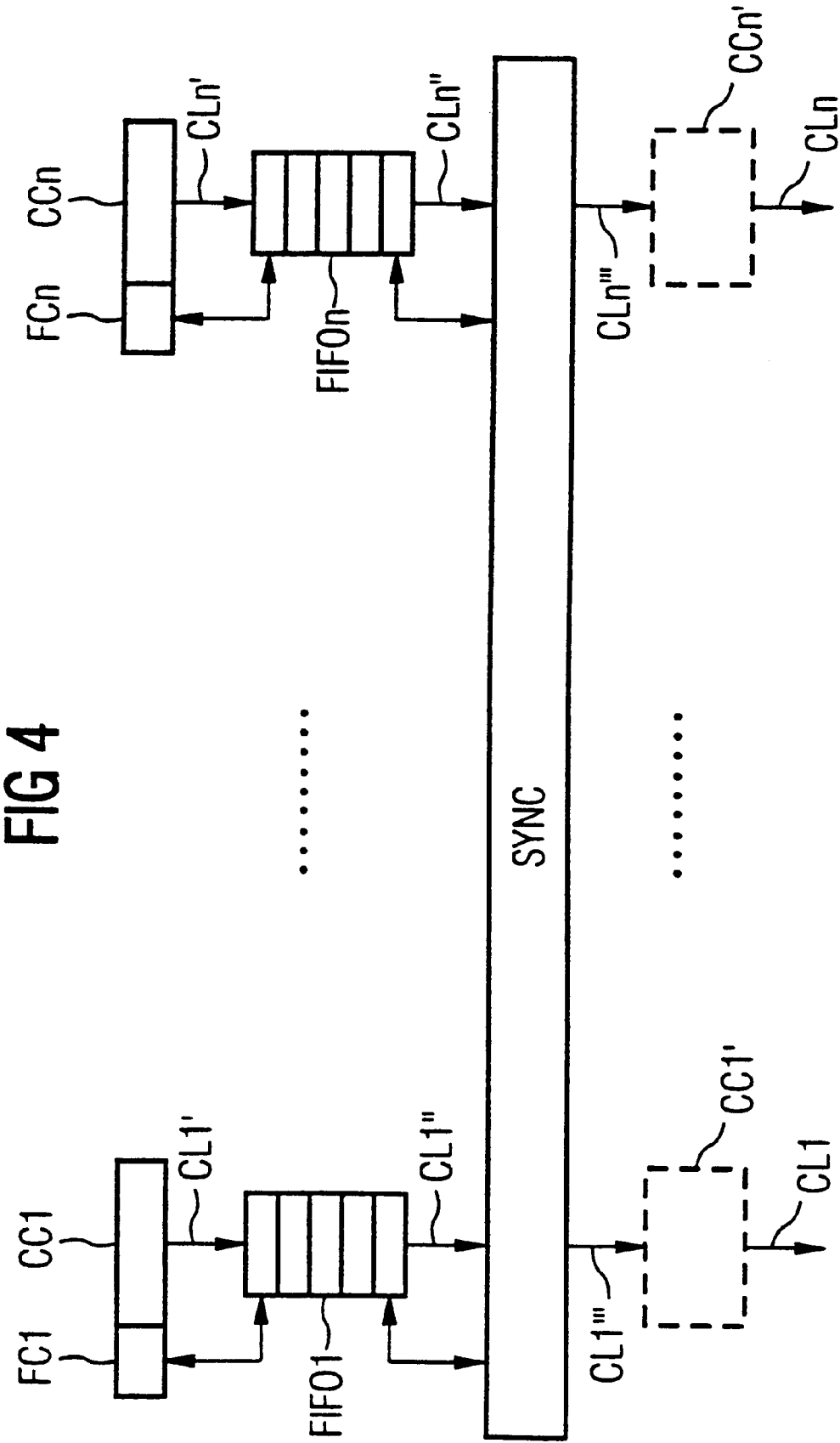

Fig. 5

| program flow | load unit | arithm. unit | store unit | ;VLIW |
|---|---|---|---|---|
| continue | A0=start A | no operation | A2=start Z | ;init addr. |
| continue | A1=start B | no operation | no operation | ;pointers |
| loop M | no operation | no operation | no operation | ;setup loop |
| loop N | no operation | no operation | no operation | ;setup loop |
| continue | load from A0++ | R1=shift(in) | no operation | ;load and shift ;element of A |
| continue | load from A1++ | R1=R1+in | no operation | ;load and add ;element of B |
| entloop | no operation | out=shift(R1) | store to A2++ | ;store ;element of Z |
| continue | A0+=lineoffs | no operation | A2+=lineoffs | ;move addr. ;pointers to start |
| endloop | A1+=lineoffs | no operation | no operation | ;of next line |

Fig. 6

| program flow | load unit | |
|---|---|---|
| continue | A0=start A | ;init address pointer |
| continue | A1=start B | ; |
| loop M | no operation | ;setup loop over matrix rows |
| loop N | no operation | ;setup loop over matrix columns |
| continue | load from A0++ | ;synchronize with arithmetic unit |
| entloop | load from A1++ | ;synchronize with arithmetic unit |
| continue | A0+=lineoffs | ;move addr. pointer to begin of next line |
| endloop | A1+=lineoffs | ;move addr. pointer to begin of next line |

| program flow | arithmetic unit | |
|---|---|---|
| loop MxN | no operation | ;setup loop over complete matrix |
| continue | R1=shift(in) | ;synchronize with load unit |
| continue | R1=R1+ in | ;synchronize with load unit |
| endloop | out=shift(R1) | ;synchronize with store unit |

| program flow | store unit | |
|---|---|---|
| continue | A2=start Z | ;init address pointer |
| loop M | no operation | ;setup loop over matrix rows |
| loop N | no operation | ;setup loop over matrix columns |
| endloop | store to A2++ | ;synchronize with arithmetic unit |
| endloop | A2+=lineoffs | ;move addr. pointer to begin of next line |

APPARATUS FOR THE HIERARCHICAL AND DISTRIBUTED CONTROL OF PROGRAMMABLE MODULES IN LARGE-SCALE INTEGRATED SYSTEMS

CROSS-REFERENCE TO RELATED APPLICATION

This is a continuation of copending international application PCT/DE99 /00101, filed Jan. 18, 1999, which designated the United States.

BACKGROUND OF THE INVENTION

Field of the Invention

The invention relates to large-scale integrated circuits which, contain a plurality of individual modules with a wide variety of functions and complexity. The modules can be flexibly configured or programmed depending on the use of the system. On the one hand, the individual modules can be supplied with programs using the lowest possible instruction bandwidth, and, on the other hand, can be coordinated and synchronized. A synchronous response of the individual modules can be achieved very easily, by way of example, by permanently assigning individual bits in very long instruction words VLIW to the respective individual modules.

If such a large-scale integrated system is used, by way of example, for processing a two-dimensional image whose pixels are read in sections from an image memory, are processed pixel-by-pixel in an arithmetic and logic unit and are finally written back to the image memory, then address generators for reading from and writing to the image memory are required in addition to the arithmetic and logic unit. The address generators have to take account of the two-dimensional nature of the object to be processed during address calculation, for example using two interleaved program loops. The arithmetic and logic unit, on the other hand, need know only the total number of pixels to be processed, but not their arrangement in the memory. A single program loop is therefore sufficient for the arithmetic and logic unit. If the instructions for the address generators and for the arithmetic and logic unit are combined into an instruction word VLIW of corresponding length, however, then the resulting program unnecessarily also has two interleaved loops for portion of the program that belongs to the arithmetic and logic unit.

In the operation of such systems, the situation frequently arises that not all the modules are active at the same time. This means that transmission bandwidth to the instruction memory, which is generally located outside the integrated circuit, is wasted, since a relatively large amount of so-called NOP instructions (no operation) are also transmitted for the modules not currently needed. One possibility of saving bandwidth to the instruction memory involves the instruction words being stored in the instruction memory in compressed form, that is to say NOP instructions largely removed, and the missing NOP instructions being added again only on the path to the individual modules.

U.S. Pat. No. 5,774,737 (see European patent application EP 0 768 602 A 2) discloses an apparatus for the hierarchical and distributed control of programmable modules. There, a multiplicity of control modules interchange control information with a superordinate control unit and use control lines to drive processing modules permanently assigned to the respective control modules.

The publication by Bernhard K. Gunther: Multithreading with Distributed Functional Units, in IEEE Transactions on Computers, Vol. 46, No. 4, April 1997, pages 399–411 discloses a synchronization unit for an apparatus having a multiplicity of control and processing modules.

SUMMARY OF THE INVENTION

The object of the invention is to provide an apparatus for the hierarchical and distributed control of programmable modules in large-scale integrated systems which overcomes the above-noted deficiencies and disadvantages of the prior art devices and methods of this kind, and which achieves the lowest possible transmission bandwidth for the instruction stream between an external instruction memory and the large-scale integrated system and achieves the lowest possible power loss in the large-scale integrated system.

With the above and other objects in view there is provided, in accordance with the invention, an apparatus for hierarchical and distributed control of programmable modules in large-scale integrated systems, comprising a multiplicity of control modules interchanging control information with a superordinate control unit and communicating through control lines to drive processing modules permanently assigned to respective the control modules, a synchronization unit connected to all the control modules via synchronization lines, a dedicated instruction cache memory allocated to each the control module and whereby respective control modules are selectively connectible and disconnectible by the superordinate control unit, and/or the processing modules are selectively connectible and disconnectible by appropriate control signals on the control lines.

The invention has the particular advantage that the individual modules can be programmed in modular fashion, which is of fundamental significance as regards development and error immunity, particularly in large-scale integrated systems having many individual modules.

In accordance with an added feature of the invention, control modules are connected to the control lines via FIFO memories and the synchronization unit.

In accordance with an additional feature of the invention, the control modules are connected to further control modules via FIFO memories and the synchronization unit, and outputs of the further control modules are connected to the control lines.

In, accordance with another feature of the invention, subordinate control modules are connected to receive control information and to interchange information with the synchronization unit, the subordinate control modules supplying the control information via control lines to processing modules assigned to the subordinate control modules.

In accordance with a concomitant feature of the invention, the control modules are essentially implemented by microprograms, and the synchronization unit, and if appropriate the subordinate control modules, are substantially hardwired.

Other features which are considered as characteristic for the invention are set forth in the appended claims.

Although the invention is illustrated and described herein as embodied in an apparatus for the hierarchical and distributed control of programmable modules in large-scale integrated systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and

BRIEF DESCRIPTION OF THE DRAWINGS

FIG. 3 is a block diagram to illustrate the separate instruction processing in the individual control units, and their synchronization;

FIG. 4 is a block diagram showing further refinements of the separate instruction processing in the individual control units, and their synchronization; and FIGS. 5 and 6 show exemplary instruction listings illustrating that separate instruction streams can reduce the number of NOP instructions.

DESCRIPTION OF THE PREFERRED EMBODIMENTS

It is essential in the context of the invention that, instead of a common instruction stream with relatively long instruction words VLIW, an individual instruction stream with relatively short instruction words is used for each programmable module of a system, and the modules are synchronized by means of a special synchronization device which can be configured, by way of example, on the basis of handshake lines and semaphores. The individual processing modules are supplied with control signals from a hierarchy of control modules (controllers), with the individual controllers being supplied or controlled by a microcontroller or RISC (reduced instruction set) processor and being synchronized by means of the synchronization device. The separate instruction streams can reduce the number of NOP instructions, as will be understood from a review of the exemplary table listings in FIGS. 5 and 6. Furthermore, the individual control units contain dedicated instruction memories (instruction caches) and it is only ever necessary to interchange the instructions in the instruction cache memories of the control modules whose control program is to be changed, which allows the transmission bandwidth to be reduced further. Since the separate instruction streams allow greater decoupling of the modules than in the case of approaches using a common, very long instruction word VLIW, and all the modules are not necessary all the time, the modules which are currently not required are disconnected or switched to a standby mode. This significantly reduces the power consumption of the large-scale integrated system.

Figure 1:
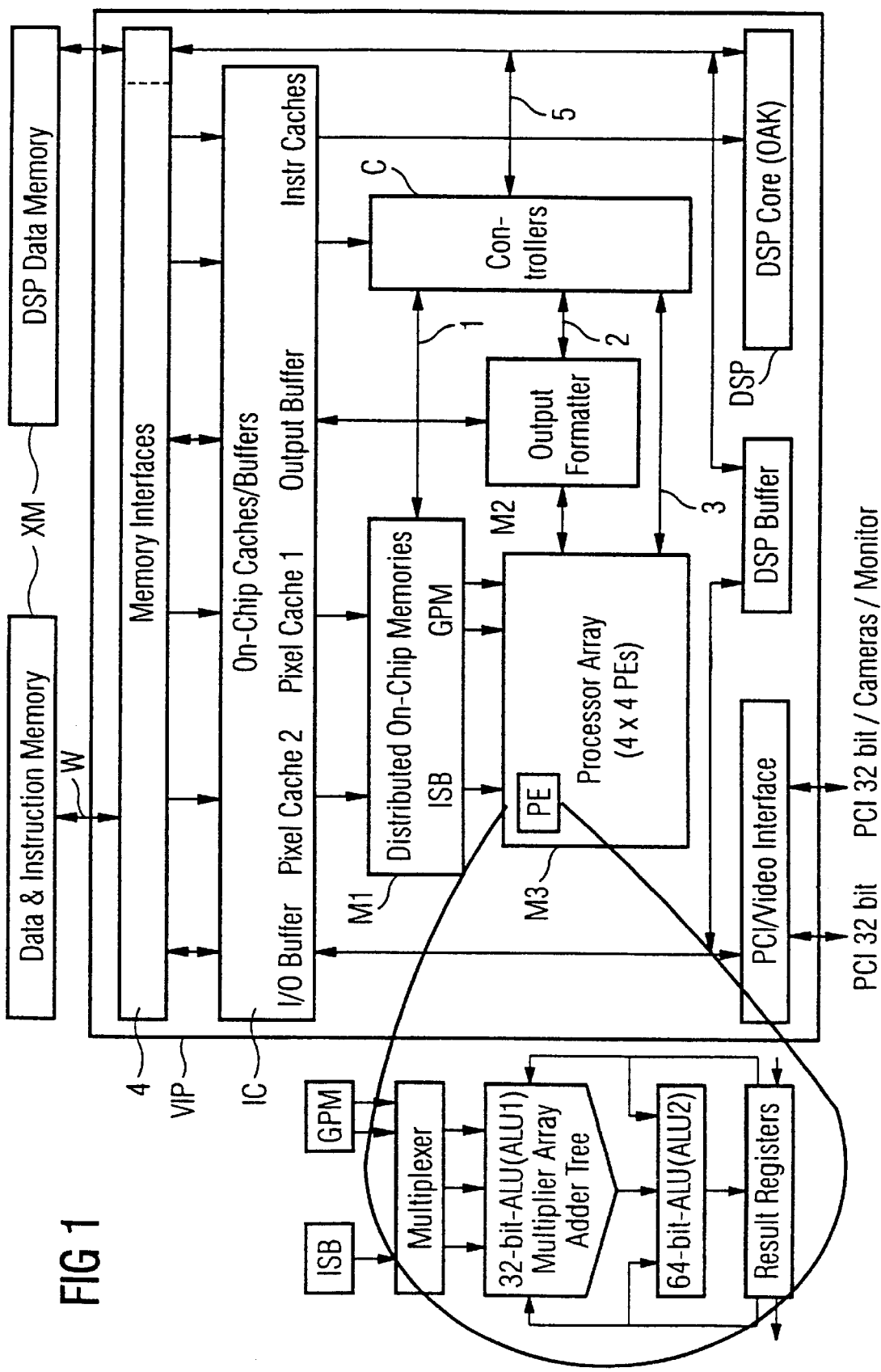
FIG. 1 is a block diagram of a large-scale integrated vision instruction processor having programmable modules.

Referring now to the figures of the drawing in detail and first, particularly, to FIG. 1 thereof, there is seen an exemplary vision instruction processor VIP or video input processor which has an interface to external memories XM. Instruction words W, among other things, are read from the external memory XM into a plurality of instruction cache memories IC via memory interfaces, with one such cache memory being assigned to one of a plurality of control modules C in each case. Individual processing modules M1 . . . M3, such as distributed memories located on the chip, or a processor array, interchange data with the respectively associated control modules via separate lines 1 . . . 3. The specific activation of the control modules C1 . . . C6, and hence also of the processing modules M1 . . . M3, is undertaken by a superordinate, generally freely programmable controller unit DSP, for example a RISC core or a DSP core. Activation/deactivation can go as far as complete connection/disconnection of the entire respective module, or else may affect only parts of the respective module.

Figure 2:
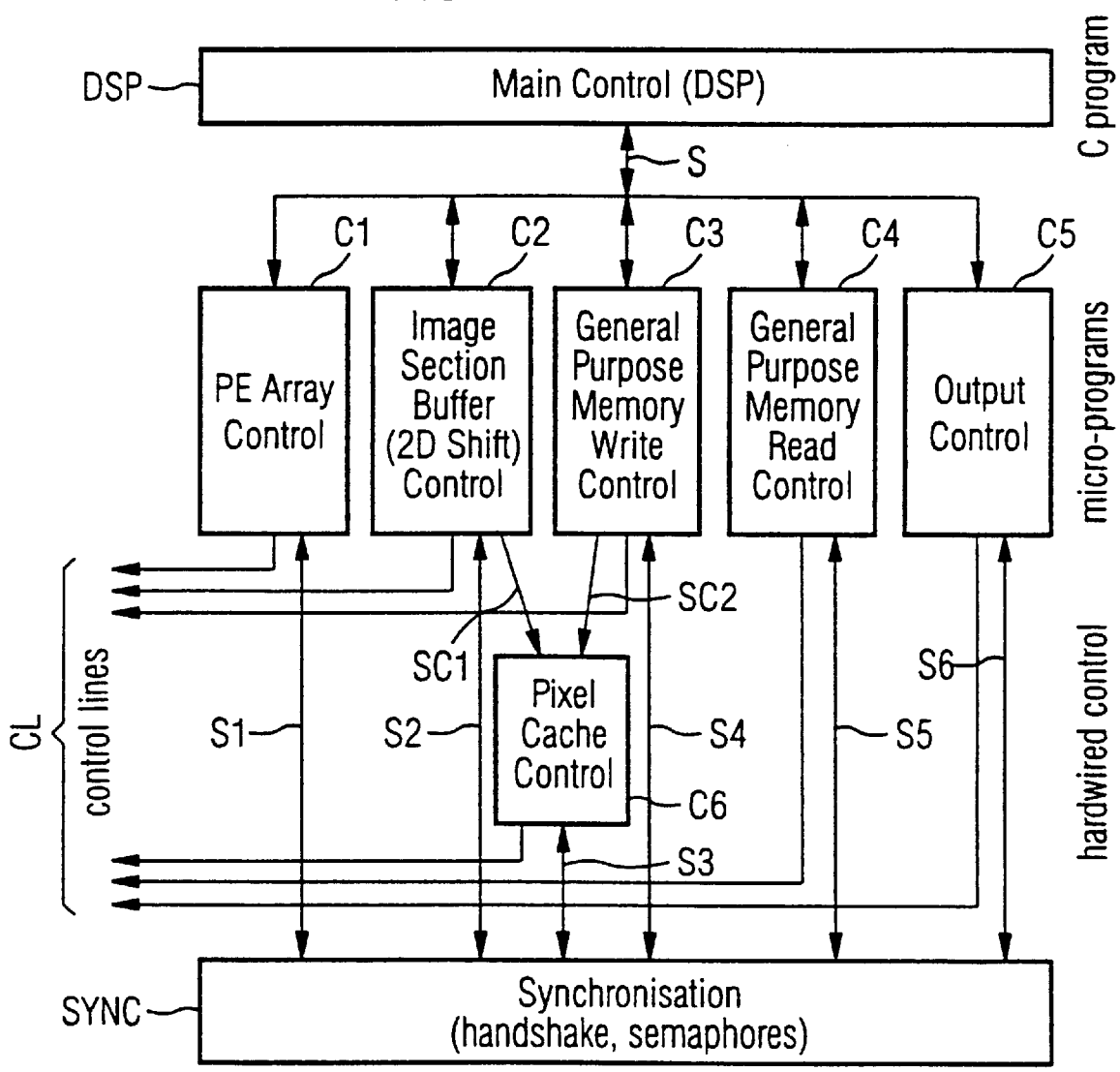
FIG. 2 is a block diagram explaining a hierarchy of control units.

FIG. 2 shows a hierarchy of the controller modules, with the superordinate controller unit DSP, whose control program is programmed in a high-level language, for example, supplying subordinate controller modules C1 . . . C5 with control data S. In this arrangement, these subordinate controller modules are assigned to particular processing modules, such as the processor array, memory or output unit, and can use control information formed in them to drive either processing modules, using control lines CL which are part of the data connections 1 . . . 3 in FIG. 1, or else control modules C6 which are subordinate to the controller modules, in which case a plurality of control modules which are above said control modules C6 in the hierarchy are able to supply control information SC1, SC2 to a subordinate control module C6. The controller modules driven directly by the superordinate controller unit DSP are generally implemented in the form of a, microprogram, whereas the subordinate control modules, e.g. C6, are usually in the form of pure hardware. Both the control modules C1 . . . C5 driven directly by the superordinate control unit and the subordinate control modules are temporally synchronized by means of a common synchronization unit SYNC. The synchronization unit SYNC essentially comprises hardware and is connected to the control modules by means of bidirectional control lines S1 . . . S6. If necessary, precisely timed synchronization is achieved in this manner using handshake lines, for example. Less rigorous synchronization can be implemented, possibly with hardware support, by means of semaphores, event counters or the like.

With reference to FIG. 3, a plurality of instruction cache memories IC1 . . . Icn address an instruction memory IM in succession, and, for each instruction memory, an instruction word I with a relatively short word length is read in succession into the individual instruction cache memories. Each control module thereby converts the respective instruction word, for example the instruction word IB1 in control module C1, into a control component CC1 for a control line CL1' and a flow control component FC1 to influence the instruction address in the instruction cache memory. The synchronization unit SYNC ensures that the control information CL1' . . . CLn' formed at the outputs of the individual control modules is switched onto the control lines CL1 . . . CLn in synchronization.

To improve decoupling, in a further illustrative embodiment, as shown in FIG. 4, FIFO memories FIFO1 . . . FIFOn are additionally provided between the control modules and the synchronization unit SYNC. The FIFO memories are controlled by the respective flow control parts FC1 . . . FCn and by the synchronization unit. The synchronization unit SYNC ensures that the control signals CL1" . . . CLn" produced at the outputs of the individual FIFO memories are switched onto the control lines CL1 . . . CLn in synchronization.

In a second further illustrative embodiment, the synchronization unit SYNC does not switch control signals onto the control lines directly (as indicated by dashed lines in FIG. 4), but instead control signals CL1''' . . . CLn''' drive further control modules CC1' . . . CCn', and these first supply control signals for the control lines CL1 . . . CLn.

We claim:

1. An apparatus for hierarchical and distributed control of programmable modules in large-scale integrated systems, comprising a multiplicity of control modules interchanging control information with a superordinate control unit and communicating through control lines to drive processing modules permanently assigned to respective said control modules, a synchronization unit connected to all said control modules via synchronization lines, a dedicated instruction cache memory allocated to each said control module, and whereby respective control modules are selectively connectible and disconnectible by said superordinate control unit, and/or said processing modules are selectively connectible and disconnectible by appropriate control signals on said control lines.

2. The apparatus according to claim 1, wherein said control modules are connected to said control lines via FIFO memories and said synchronization unit.

3. The apparatus according to claim 1, wherein said control modules are connected to further control modules via FIFO memories and said synchronization unit, and outputs of said further control modules are connected to said control lines.

4. The apparatus according to claim 1, which comprises subordinate control modules connected to receive control information and to interchange information with said synchronization unit, said subordinate control modules supplying the control information via control lines to processing modules assigned to said subordinate control modules.

5. The apparatus according to claim 4, wherein said control modules are substantially implemented by microprograms, and said synchronization unit and said subordinate control modules are substantially hardwired.

6. The apparatus according to claim 1, wherein said control modules are substantially implemented by microprograms, and said synchronization unit is substantially hardwired.

* * * * *